United States Patent Office 3,091,550
Patented May 28, 1963

3,091,550
ADSORBENT COMPOSITIONS AND METHOD OF COATING THEREWITH
Ernest G. Doying, Lakewood, Ohio, assignor to Union Carbide Corporation, a corporation of New York
No Drawing. Filed Sept. 24, 1958, Ser. No. 762,902
6 Claims. (Cl. 117—76)

This invention relates generally to adsorbent compositions, and to a method of applying the same.

The capacity of activated carbon, activated alumina and silica gel for odor and moisture adsorption, respectively, has long been known. Hitherto, however, practical difficulties have been encountered in placing such materials where their effects will be most beneficial. For one, where these materials are to be inserted in containers, they can be so placed only at the expense of container volume. For another, because of the fragmentary nature of these adsorbents, it is almost impossible either to make them adhere either together, or to given surfaces without the use of some binding agent which, in most cases, deleteriously affects their adsorptive capacities. It is further often desirable for some applications to have semi-rigid materials possessing adsorptive properties. To this effect, the incorporation of finely divided activated carbon into paper pulp has been suggested and tried. Similarly, the the confinement of adsorptive material between layers of pliable material has been proposed. Both expedients, however, are prohibitively expensive for mass production, and fraught with processing problems.

The instant invention is based on the discovery that compositions containing comminuted adsorbents can be molded to any shape and form without appreciable losses in adsorptive properties by a simple casting procedure. As a corollary, it has also been discovered that most rigid and semi-rigid inactive surfaces such as paper and textile fabrics may be coated with adsorbent materials by applying thereto such adsorbents in the form of a fluid or semi-fluid mix including also binder and vehicle components to produce films which substantially possess the original characteristics of the adsorbents applied.

A simplified flow diagram of the method is as follows:

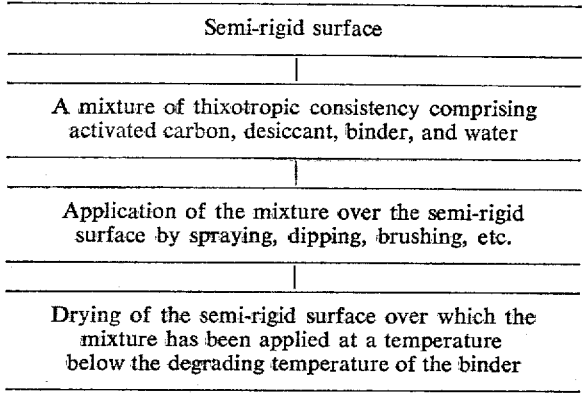

Semi-rigid surface
|
A mixture of thixotropic consistency comprising activated carbon, desiccant, binder, and water
|
Application of the mixture over the semi-rigid surface by spraying, dipping, brushing, etc.
|
Drying of the semi-rigid surface over which the mixture has been applied at a temperature below the degrading temperature of the binder The adsorbents subject of the present invention include activated carbon, alumina, silica gel, zeolite and mixtures thereof. Suitable zeolites include synthetic zeolites of the type disclosed and claimed in U.S. Patents 2,882,243 and 2,882,244, and U.S. patent application Ser. No. 400,387, filed December 24, 1953, now abandoned.

The specific proportions of the constituents used in the invention are:

| | Parts by weight |
|---|---|
| Activated carbon | 0 to 100 |
| Desiccant | 0 to 100 |
| Binder | 5 to 30 |
| Water | 60 to 350 |

The initial step in the preparation of cast articles or films is to grind or size the adsorbent material according to the needs of the desired end product. For this purpose practically any particle size may be used. Smaller particles, that is through 200 mesh (0.074 mm. openings), are advantageous, because they remain suspended in the mix, even when greatly diluted, and produce stronger finished products. On the other hand, larger particles make weaker pieces, but increase the porosity and decrease their density. Further, on such particles some binders have less retarding effects on adsorptive capacity.

The binder-vehicle emulsion employed must be one in which the binder remains dispersed, but not dissolved, and of equal importance, one from which the emulsified or dispersed binder is not precipitated when contacted with the adsorbent particles, which bear a polar charge. When an additional amount of vehicle is to be added to the emulsion or to the mix, the vehicle must be one which will not cause precipitation of the binder, nor dissolve it. For most purposes water is by far the best vehicle, because it is easily removed from the mix by heat, is stable, does not harm the active surfaces, is not combustible and costs nearly nothing.

The binder-vehicle emulsion must contain sufficient vehicle, usually water, to satisfy the absorptive capacity of the absorbent when the emulsion is first contacted with the adsorbent materials. For convenience or for controlling the porosity of the composition, the adsorbent materials are sometimes first wetted with added vehicle before the vehicle-binder emulsion is added to the mix.

Emulsions which have been found to be unsuitable for the practice of this invention are neoprene latex material, rubber latex, polytetrafluoroethylene latex and latex of the copolymer styrene-butadiene in which the butadiene content is high. A curdling, with the resultant precipitation of binder, occurred when these emulsions were contacted with the adsorbent material. It can be said that those binders which curdle when their emulsions are contacted with adsorbents are unsuitable for the present purposes.

It is considered that for the successful application of the teachings of this invention that the binder in the vehicle-binder emulsion should remain suspended until the emulsion is spread throughout the mass of adsorbent particles. As the water is removed from the emulsion, by absorption and by evaporation, the binder is deposited on the particles.

The amount of water used in a mix depends first upon the density and porosity of the adsorbent material, second upon the particular properties of the binder, and third upon the intended use and application of the mix. By changing the amount of water, the composition subject of this invention may be extruded, pressure molded, spread, cast, coated or applied by dipping. Thus, an amount of water varying from 100 percent to 600 percent or more of the adsorbent's weight may be necessary to produce the aforementioned effects.

As an example, a typical activated carbon will require about 80 percent water to saturate and wet its surface. With a polystyrene emulsion as the binder, an additional 25 percent water will make an extrudable mix, while 35 to 40 percent more water will make the mixture spreadable or pourable and 55 to 60 percent more water, or a total of 135 to 140 percent water, will make the mixture suitable for dip coating. But with other binders the amount of water required to perform these four operations will be quite different. For example, with a polyvinyl acetate emulsion, the total amount of water required to give an extrudable mix will be about 145 percent of the carbon weight, 165 percent will be required for spreading, 190 percent for pouring and 350 percent or more for dipping. Still other binders, such as a very viscous methyl cellulose, may require as much as 700 percent water to make the mixture suitable for dipping. Four variants of the method are envisaged then, depending upon the consistency of the mixture as regulated by the amount of water incorporated therein.

The adhesive binder should be insoluble in water, but highly dispersible in that medium. It must add body to the mixture, and should keep the adsorbent particles at least temporarily suspended, even when diluted. Further, it must form a tough film which adheres well to the adsorbent particles when set while remaining permeable to gases and vapors after setting. Various adhesives suitable for the practice of this invention will be mentioned below.

Mixing the adsorbent binder and vehicle is the next step in the procedure. For this, two variations are available. Either the vehicle-binder suspension can be diluted with the vehicle and then mixed with the adsorbent, or the adsorbent can be saturated with the vehicle, and the vehicle-binder suspension added to the wet slurry. The former gives the lowest density, most porous briquets or coatings because the air displaced from the adsorbent by the water remains in the mix, while the latter procedure increases the density by expelling the air from the adsorbent before adding the vehicle-binder suspension. Extended mixing also decreases the density and increases the porosity by whipping air into the mix, which effect is due to the thixotropic nature of the binder emulsion.

The mixture thus prepared, depending upon the amount of vehicle used, can be poured, spread or extruded. The casting operation is preferably performed on a vibrating table to prevent air pockets, by pouring a fluid mix, or extruding a semi-fluid mix into a mold.

Films are cast by spreading a semi-fluid mix over the surface of the material to be coated, or may be applied by dipping the object to be coated in a fairly fluid mix. Sheets of paper and tubular objects have been coated by both procedures, but dipping is recommended for small diameter tubes, and crimped or corrugated sheets of paper.

Briquets or coatings or films are set to a solid by evaporating the water. This can be accomplished at room temperature with some binders, but it is preferable to pre-dry most articles at 60° C. and complete the drying at 100° to 175° C. depending upon the binder and adsorbent. The rate of drying or setting is not critical, except possibly for large sections, and, of course, the maximum temperature employed must not exceed the degrading temperature of the binder used.

Examples of suitable mixes for various applications are in parts by weight.

Casting mix: Parts
   Activated carbon (95 percent through 100 mesh) _____ 100
   Binder solids (polystyrene) _____ 20
   Methocel (4000 cps. methyl cellulose) _____ 0.25
   Total water _____ 120

Coating mix: Parts
   Activated carbon _____ 100
   (100 percent through 150 mesh)
   (95% through 200 mesh)
   Binder solids (polystyrene) _____ 15
   Methocel (4000 cps. methyl cellulose) _____ 0.15
   Total water _____ 150
Pressure molding mix (1):
   Activated carbon (65 to 200 mesh) _____ 100
   Binder solids (polyvinyl acetate) _____ 17.2
   Total water _____ 68.3
Pressure molding mix (2):
   Activated carbon (65 to 200 mesh) _____ 50
   Silica gel (65 to 200 mesh) _____ 50
   Binder solids (polyvinyl acetate) _____ 16.8
   Total water _____ 83.2

Suitable binders for use in the practice of the invention may be classified as follows:

Group I includes water dispersible colloidal polymeric materials that give thick viscous suspensions or gels with water such as hydroxy ethyl cellulose, methyl cellulose, casein, salts of high molecular weight polymeric acids.

Group II includes aqueous emulsions or dispersions of thermoplastic resins such as polyvinyl acetate, polyvinyl chloride, polystyrene, styrene-butadiene copolymers and the acrylic resin emulsions.

Careful selection of the binder, based upon the desired intended application, is of paramount importance. In all cases the peculiar properties of the binders themselves must be considered. Thus, while casein performs satisfactorily as a bond, it must be dissolved with ammonia and treated with formaldehyde to become insoluble and to prevent putrefaction. As this treatment does not completely eliminate that latter tendency, casein cannot be considered as a binder for articles to be used for food or medicinal packages which may have a long shelf life. Choice of binder may also be dictated by the type of surface to which the adsorbent is to be applied. Thus, polystyrene sticks tightly to metals and glass, but may be striped from paper, whereas methyl cellulose will not stick to metal or glass, but does stick to paper. Where it is desired to coat or impregnate, more flexible fabrics such as, for example, textile fibers, the copolymer of styrene and butadiene will best perform.

It is obvious that the physical strength of the formed articles increases with binder content, while the activity decreases only slightly. Data illustrating this is given in Table I under Example I for carbon and a polystyrene emulsion binder.

The following examples are given as illustrating embodiments of the invention:

EXAMPLE I

Four 150 gram portions of activated carbon sized through 65 mesh and having the following screen analysis:

Percent
On 100 mesh _____ 11.6
100–200 mesh _____ 27.0
200–325 mesh _____ 25.2
On pan _____ 36.2 were mixed with 180, 168, 140 and 102 grams water and allowed to stand overnight in a covered beaker to expel the adsorbed air and to saturate the particles. Twenty-three, 46, 92 and 138 grams portions of a polystyrene emulsion containing 32.6 percent solids and 67.4 percent water, were then added to each, and the mixtures stirred for 15 minutes to distribute the emulsion uniformly throughout the carbon. The creamy mixtures were then poured or spread in plastisol molds, dried overnight at 60° C. and finished by setting at 150° C. The resulting briquets were hard and strong, had smooth, dust-free surfaces, and their adsorptive capacity, as judged by the adsorption of carbon tetrachloride vapor from dry air saturated with the vapor at 0° C., ranged from 62 to 67 percent (based on the contained carbon), depending upon the amount of binder used. As the original carbon had an activity, or adsorptive capacity of 70 percent, the loss in capacity due to the binder only amounted to 4.3 percent for 5 parts of binder to 11.4 percent for 30 parts of binder. These results are compared in Table I, which shows the overall mix composition, the drying conditions and the briquet characteristics.

*Table I*

| Mix: | | | | |
|---|---|---|---|---|
| Carbon, parts | 100 | 100 | 100 | 100 |
| Polystyrene solids, parts | 5 | 10 | 20 | 30 |
| Total water, parts | 130 | 133 | 135 | 130 |
| Drying conditions: | | | | |
| Time at 60° C., hours | 16 | 16 | 16 | 16 |
| Time at 150° C., hours | 8 | 8 | 16 | 16 |
| Briquet characteristics: | | | | |
| Block density | .582 | .598 | .660 | .663 |
| Impact strength (1¼ inch x ⅛ inch thick disks), ft. lb | .057 | .141 | .160 | |
| Crushing strength (1 inch x .455 inch thick cylinder), p.s.i | 720 | 2,240 | 3,350 | 3,580 |
| Activity (crushed briquet), percent CCl₄ adsorbed by base carbon | 67.2 | 63.2 | 61.3 | 61.7 |

EXAMPLE II

Two hundred grams of through 200 mesh silica gel was mixed with 195.4 grams water and allowed to stand in a covered container overnight to saturate and equilibriate. 54.6 grams of a polyvinyl acetate latex containing 55 percent solids and 45 percent water, was then added and the mixture stirred for 15 minutes to distribute the binder. The mixture was then poured into plastisol molds, dried overnight at 60° C., removed from the molds and re-dried a second night at 1775° C. The resulting briquets were hard, had smooth surfaces and were dust-free. Compared with the original silica gel powder as in Table II, infra, it is to be noted that the moisture adsorbent capacity, as determined in desiccators over sulfuric acid solutions, was only reduced about 2 percent by the presence of the binder.

*Table II*

| | | Original silica gel |
|---|---|---|
| Mix: | | |
| Silica gel, parts | 100 | |
| Polyvinyl acetate solids, parts | 15 | |
| Total water, parts | 110 | |
| Drying conditions: | | |
| Time at 60° C., hours | 16 | |
| Time at 175° C., hours | 16 | |
| Briquet characteristics: | | |
| Block density | .861 | |
| Impact strength (1¼ inch x ⅛ inch thick disks), ft. lb | .168 | |
| Crushing strength (1 inch x .455 inch thick cylinder), p.s.i | 3,550 | |
| Moisture adsorption (based on contained silica gel): | | |
| Adsorbed at 5.7% RH, percent | 4.6 | 4.7 |
| Adsorbed at 37.2% RH, percent | 20.9 | 21.3 |
| Adsorbed at 60.0% RH, percent | 33.8 | 34.6 |

EXAMPLE III

Twenty-five grams of activated carbon, 31.1 grams of synthetic zeolite containing 6.1 grams water (on 350° C. basis), 13.6 grams of polyvinyl acetate latex (having a 55 percent solids content and a 45 percent water content) and 43 grams of water were mixed together in a beaker. The resulting wet slurry which contained 15 parts of polyvinyl acetate solids and 110 parts of water per 100 parts of combined adsorbents, was then poured on sheets of paper, and allowed to set to a solid by evaporation of the water at 60° C. The resulting irregularly shaped, dust-free pieces were stripped from the paper and heated to 200° C. to dehydrate the adsorbents, and then evaluated for moisture and carbon tetrachloride adsorption by exposing the test pieces over suitable sulfuric acid solutions or liquid carbon tetrachloride in desiccators at room temperature.

These results appear in Table III.

*Table III*

| | Bonded adsorbent of carbon and zeolite |
|---|---|
| Mix: | |
| Active carbon, parts | 50 |
| Zeolite (350° C. dried basis), parts | 50 |
| Binder solids, parts | 15 |
| Total water, parts | 110 |
| Drying conditions: | |
| Time at 60° C., hours | 16 |
| Time at 200° C., hours | 16 |
| Briquet characteristics, percent adsorbed on adsorbent basis: | |
| Carbon tetrachloride | 69.6 |
| Moisture at 5.7% R.H | 7.5 |
| Moisture at 37.2% R.H | 12.4 |
| Moisture at 60.0% R.H | 23.7 |

| | Unbonded adsorbents | | |
|---|---|---|---|
| | Carbon alone | Zeolite alone [1] | Weighed avg. carbon and zeolite |
| Briquet characteristics, percent adsorbed on adsorbent basis: | | | |
| Carbon tetrachloride | 86.4 | 45.2 | 65.8 |
| Moisture at 5.7% RH | 0 | 17.8 | 8.9 |
| Moisture at 37.2% RH | .7 | 20.0 | 10.4 |
| Moisture at 60.0% RH | 19.8 | 23.2 | 21.5 |

[1] Dried at 200° C.

The data included in Table III shows by comparison with the absorbent data for the powdered adsorbents themselves that the bonding operation does not materially retard or reduce the ability of the absorbents to absorb either organic vapors or moisture. On a weighted basis, the adsorption was slightly higher than that of the original powders, showing the successful union in one article of the respective preferential affinities of the selected adsorbents. It is further to be noted that plastic binders do not destroy the zeolite's ability to adsorb moisture at very low humidities.

EXAMPLE IV

Kraft paper tubes 5/16 inch in diameter by about 4 inches long were coated with polyvinyl acetate by dipping in an aqueous latex of this resin containing 25 percent solids, and drying at 150° C. These tubes were weighed and then coated with activated carbon using the six different binders shown in Table IV. In each case the dipping bath was prepared in a small beaker from a weighed amount of the binder which was diluted with water until a suitable dipping consistency was reached. From 10 to 15 grams of through 200 mesh carbon was then added to each, stirred until uniform and then transferred to a glass cylinder for the dipping. The weighed tubes were dipped in the various baths, allowed to drain, dried to constant weight at 125° C. and finally weighed to determine the weight of the coating. In two instances, the tubes were given a second coating to increase the weight of the coating.

Table IV shows the overall composition of the carbon coating baths, the weight of the tubes before and after coating, and the calculated weight of the coating per square inch of tube surface area. Also, the adsorptive capacity of the carbon coating for carbon tetrachloride is shown at two concentrations of this vapor in air. As the original carbon adsorbed 75.4 and 51.1 percent at the 240 and 6.4 milligram per liter concentrations, it is evident from the data that polystyrene and methyl cellulose have the least effect upon the adsorption of this vapor by the carbon.

Table IV

| Binder | Poly-vinyl acetate | Styrene-butadiene | Poly-styrene | Methyl cellulose | Hydroxy-ethyl starch | Animal glue |
|---|---|---|---|---|---|---|
| Mix: | | | | | | |
| Carbon, parts | 100 | 100 | 100 | 100 | 100 | 100 |
| Binder solids, parts | 15 | 15 | 15 | 15 | 15 | 15 |
| Total water, parts | 346 | 160 | 163 | 715 | 400 | 159 |
| Weight of paper tubes, g | .546 | .701 | .531 | .590 | .518 | .513 |
| Number of coats applied | 2 | 2 | 1 | 1 | 1 | 1 |
| Coating weight, g | .729 | 1.006 | 1.026 | .609 | .683 | 1.897 |
| Coating weight, g./sq. in | .092 | .127 | .130 | .081 | .081 | .240 |
| Carbon weight, g | .634 | .876 | .893 | .515 | .596 | 1.650 |
| Carbon weight, g./sq. in | .080 | .111 | .113 | .070 | .071 | .212 |
| Carbon tetrachloride adsorption, percent adsorbed based on carbon at— | | | | | | |
| 240 mg./l. concentration | 51.5 | 56.3 | 70.7 | 70.7 | 63.0 | |
| 6.4 mg./l. concentration | 34.0 | 35.9 | 48.2 | 48.8 | 43.3 | 36.8 |

Where fibrous pliable or sheet-like material is sought to be rendered moisture or odor absorbent or both, the same may be immersed as above indicated in Example IV, or a suspension substantially identical with those therein listed may be sprayed or applied thereon.

A useful application of the invention involves the preparation of odor or moisture absorbent filters for gas or air from sheets of crimped or corrugated paper coated with the absorbent. When these sheets are assembled in a pack, very efficient filters are obtained, that have high adsorptive capacity, low resistance to the flow of gas and do not add dust to the gas stream like granular adsorbents.

An especially noteworthy advantage of the present invention is the surprisingly steadfast adherence of the adsorbent coatings onto coated surfaces. The adhesive force provided by the disclosed binder is such that flat surfaces can be first coated with absorbent and then crimped by embossing, stamping or by otherwise providing undulations thereon. For best results surfaces which are to be crimped after coating with adsorbents are precoated with a dilute emulsion of the binder. As an example of this embodiment of the invention, flat sheets of 4 mil thick kraft paper were clamped top and bottom between stainless steel spreader bar and coated with a polyvinyl emulsion containing 12 percent solids. The thus-coated sheets were allowed to dry. After drying, a carbon coating was applied by dipping the sheets in a bath containing 15 parts by weight of polystyrene resin, 0.15 part of methyl cellulose and 200 to 215 parts of water per 100 parts of carbon. The coated sheets were dried at 150° C., and were crimped with rolls heated to about 130° C. Filter packs can be assembled from such sheets by alternately stacking flat and crimped sheets in a metal filter frame.

Another useful application of the instant invention lies in the coating of bottle caps to be used in the bottling of vitamins and other pharmaceuticals. Excellent results have been obtained, for example, in the abatement of odors evolved from capsulated liver extracts, vitamins and other products by the employment of activated carbon cast in the bottle caps by the present technique. Adsorbents placed in the bottle cap have the advantage of being located at the mouth of the bottle where vapor diffusion occurs.

This application is a continuation-in-part of my copending application Serial No. 489,753, filed February 21, 1955, now abandoned, which is in turn a continuation of my application Serial No. 480,270, filed January 6, 1955, now abandoned.

What is claimed is:

1. A method of forming adsorbent coatings on semi-rigid surfaces, which method comprises forming a mixture of thixotropic consistency from 100 parts by weight in the aggregate of activated carbon and of a desiccant selected from the group consisting of synthetic zeolite, silica gel and alumina, from 5 to 20 parts of water-insoluble, water-dispersible binder selected from the group consisting of methyl cellulose, hydroxyethyl cellulose, polyvinyl acetate, polyvinyl chloride, polystyrene and styrene-butadiene copolymers about 350 parts of water, applying said mixture over aforesaid semi-rigid surface and drying said coated surface at a temperature less than the degrading temperature of the binder.

2. The method of claim 1, wherein said mixture is applied to the semi-rigid surface by spraying.

3. The method of claim 1, wherein said mixture is applied to said surface by dipping.

4. The method of claim 1, wherein said mixture is applied to said surface by brushing.

5. A method of providing coated crimped sheets of material comprising providing sheets having substantially flat surfaces, applying to said sheets a coating of a dilute emulsion of a water-dispersible polymeric material selected from the group consisting of methyl cellulose, hydroxyethyl cellulose, polyvinyl acetate, polyvinyl chloride, polystyrene and styrene-butadiene copolymers drying the thus-coated sheets, applying an adsorbent coating thereon from a latex consisting of an aqueous dispersion consisting of one of said polymeric materials and of activated carbon and optionally a desiccant selected from the group consisting of synthetic zeolite, silica gel and alumina, drying the coated sheets and crimping the dried sheets.

6. An adsorbent article containing an active composition consisting of 20 to 100 parts by weight of activated carbon; said active composition being integrally united by a water-insoluble, water-dispersible binder selected from the group consisting of methyl cellulose, hydroxy-ethyl cellulose, polyvinyl acetate, polyvinyl chloride, polystyrene and styrene-butadiene copolymers, present in an amount ranging from about 5 to about 30 parts by weight of said article.

References Cited in the file of this patent

UNITED STATES PATENTS

| | | |
|---|---|---|
| 1,594,810 | Benner et al. | Aug. 3, 1926 |
| 1,717,171 | Schorger | June 11, 1929 |
| 2,302,833 | Behrman | Nov. 24, 1942 |
| 2,423,702 | Hart | July 8, 1947 |
| 2,500,617 | Meigs | Mar. 14, 1950 |
| 2,579,743 | Jyrlandsky | Dec. 25, 1951 |
| 2,597,872 | Iler | May 27, 1952 |
| 2,610,167 | Te Grotenhuis | Sept. 9, 1952 |
| 2,664,453 | Lang | Dec. 29, 1953 |
| 2,699,432 | Marra et al. | Jan. 11, 1955 |
| 2,760,941 | Iler | Aug. 28, 1956 |
| 2,838,416 | Babiarz et al. | June 10, 1958 |
| 2,933,455 | Doying | Apr. 19, 1960 |
| 2,955,958 | Brown | Oct. 11, 1960 |

FOREIGN PATENTS

| | | |
|---|---|---|
| 675,627 | Great Britain | July 16, 1952 |

UNITED STATES PATENT OFFICE
CERTIFICATE OF CORRECTION

Patent No. 3,091,550 May 28, 1963

Ernest G. Doying

It is hereby certified that error appears in the above numbered patent requiring correction and that the said Letters Patent should read as corrected below.

Column 5, line 34, for "1775° C." read -- 175° C. --.

Signed and sealed this 31st day of December 1963.

(SEAL)
Attest:
ERNEST W. SWIDER

Attesting Officer

EDWIN L. REYNOLDS

Acting Commissioner of Patents